United States Patent
Gaiser

(10) Patent No.: US 7,468,166 B2
(45) Date of Patent: Dec. 23, 2008

(54) EXHAUST GAS CLEANING APPARATUS

(75) Inventor: Gerd Gaiser, Reutlingen (DE)

(73) Assignee: J. Eberspaecher GmbH & Co. KG, Esslinger (DE)

( * ) Notice: Subject to any disclaimer, the term of this patent is extended or adjusted under 35 U.S.C. 154(b) by 718 days.

(21) Appl. No.: 10/958,902

(22) Filed: Oct. 5, 2004

(65) Prior Publication Data

US 2005/0079111 A1    Apr. 14, 2005

(30) Foreign Application Priority Data

Oct. 6, 2003    (DE)    ............... 103 46 286

(51) Int. Cl.
 *B01D 50/00* (2006.01)
 *B01D 53/34* (2006.01)
(52) U.S. Cl. .............. 422/180; 422/168; 422/171; 422/177
(58) Field of Classification Search ................ 422/168, 422/171, 177, 180
See application file for complete search history.

(56) References Cited

U.S. PATENT DOCUMENTS

| | | | |
|---|---|---|---|
| 4,728,591 A | 3/1988 | Clark et al. | |
| 5,106,729 A | 4/1992 | Lindsay et al. | |
| 5,138,174 A | 8/1992 | Tang | |
| 5,143,854 A | 9/1992 | Pirrung et al. | |
| 5,300,133 A * | 4/1994 | Schuster et al. | ............... 55/489 |
| 5,314,829 A | 5/1994 | Coles | |
| 5,346,683 A | 9/1994 | Green et al. | |
| 5,363,697 A | 11/1994 | Nakagawa | |
| 5,372,930 A | 12/1994 | Colton et al. | |
| 5,384,261 A | 1/1995 | Winkler et al. | |
| 5,440,122 A | 8/1995 | Yasutake | |
| 5,443,791 A | 8/1995 | Cathcart et al. | |
| 5,445,934 A | 8/1995 | Fodor et al. | |

(Continued)

FOREIGN PATENT DOCUMENTS

| | | |
|---|---|---|
| DE | 33 30 020 A1 | 2/1985 |
| DE | 197 25 378 A1 | 12/1998 |
| DE | 19 750 980 * | 5/1999 |
| EP | 0 835 684 A2 | 4/1998 |
| EP | 1 431 528 A2 | 6/2004 |
| WO | WO-98/34015 A1 | 8/1998 |
| WO | WO 03/052243 * | 6/2003 |

OTHER PUBLICATIONS

Machine translation and Derwent translated Abstract of DE 19 750 980.*

(Continued)

*Primary Examiner*—Walter D. Griffin
*Assistant Examiner*—Lessanework T Seifu
(74) *Attorney, Agent, or Firm*—Osha Liang LLP

(57) ABSTRACT

An exhaust gas cleaning apparatus for cleaning an exhaust gas emitted from a combustion engine has a stack of plural material layers successively arranged on each other in a stacking direction. The material layers are made of a porous material being permeable to the exhaust gas. The stack has an entry side and an exit side. Plural exhaust gas flow channels are defined in the stacking direction between two adjacent material layers in the stack. The exhaust gas flow channels are defined by surfaces of the material layers which have, when viewed in a flow direction of the exhaust gas from the entry side to the exit side, a plurality of concave and convex areas. A first group of exhaust gas flow channels is formed to be open at the entry side of the stack and closed at the exit side thereof.

36 Claims, 9 Drawing Sheets

U.S. PATENT DOCUMENTS

| | | | |
|---|---|---|---|
| 5,445,971 A | 8/1995 | Rohr | |
| 5,453,970 A | 9/1995 | Rust et al. | |
| 5,467,642 A | 11/1995 | Hosaka et al. | |
| 5,472,881 A | 12/1995 | Beebe et al. | |
| 5,482,601 A | 1/1996 | Ohshima et al. | |
| 5,514,540 A | 5/1996 | Teoule et al. | |
| 5,514,550 A | 5/1996 | Findlay et al. | |
| 5,519,212 A | 5/1996 | Elings et al. | |
| 5,532,128 A | 7/1996 | Eggers et al. | |
| 5,700,434 A | 12/1997 | Gaiser | |
| 6,207,116 B1 | 3/2001 | Heed | |
| 6,245,301 B1 * | 6/2001 | Stroom et al. | 422/179 |
| 6,534,021 B1 | 3/2003 | Maus | |
| 2002/0042081 A1 | 4/2002 | Henderson et al. | |
| 2002/0063212 A1 | 5/2002 | Mirkin et al. | |
| 2002/0076927 A1 | 6/2002 | Henderson et al. | |
| 2002/0114987 A1 | 8/2002 | Oscarsson et al. | |
| 2002/0122873 A1 | 9/2002 | Mirkin et al. | |
| 2002/0123135 A1 | 9/2002 | Henderson et al. | |
| 2002/0146714 A1 | 10/2002 | Lieber et al. | |
| 2002/0172943 A1 | 11/2002 | Henderson et al. | |
| 2002/0179434 A1 | 12/2002 | Dai et al. | |
| 2003/0013111 A1 | 1/2003 | Henderson et al. | |
| 2004/0208803 A1 * | 10/2004 | Bruck | 422/180 |

OTHER PUBLICATIONS

Gerd Gaiser, et al., "Warme- und Stoffubergang in Katalysatoren mit regelmaβiger Formgebung", Chem.-Ing.-Tech. 61 (1989), No. 9, pp. 729-731— This publication discloses heat and particle transport characteristics in a catalyst for exhaust gas cleaning having flow channels defined by corrugated walls which are impermeable for the exhaust gas.

* cited by examiner

EXHAUST GAS CLEANING APPARATUS

BACKGROUND OF THE INVENTION

1. Field of the Invention

The present invention relates to an exhaust gas cleaning apparatus and a method for manufacturing an exhaust gas cleaning apparatus for cleaning an exhaust gas emitted from a combustion engine.

2. Brief Description of Related Art

It is commonly known that combustion engines which are operated with fossil fuels emit pollutants. These pollutants comprise in particular so called particulates, e.g. soot particles, which are harmful to the human organism. As is further known these soot particles are emitted particularly by combustion engines operated with diesel fuel, which may be mainly found in commercial vehicles and increasingly in passenger vehicles.

In order to minimize the amount of these particulates, an exhaust gas cleaning apparatus, i.e. a so called particulate filter, is used, which is arranged in the exhaust gas duct of a combustion engine.

A conventional particulate filter is shown in FIG. 1. The particulate filter 1 is arranged in a body 3 made of metal, wherein the body is embedded in a fibre mat 4, and comprises layers of material, i.e. filtering walls 5 made of a porous filtering material which is permeable to the exhaust gas. As is indicated in FIG. 1 by arrows, the exhaust gas flows from the left hand side (entry side) to the right hand side (exit side) through the particulate filter 1.

The filtering walls 5 of the particulate filter 1 shown in FIG. 1 consist of layers of porous sintered metal or of ceramic material providing flow channels. By means of the stacked arrangement of the plates, there are exhaust gas flow channels 7 formed between these plates. These exhaust gas flow channels 7 are alternately closed at the entry side and open at the exit side, and open at the entry side and closed at the exit side, respectively, whereby the exhaust gas flowing into the exhaust gas flow channels 7 at the entry side is forced to pass through the porous filtering walls 5. The passing through of the exhaust gas is indicated by arrows 9 in FIG. 1. The filtering effect of the particulate filter 1 is based on the passing through of the exhaust gas through the filtering walls 5, whereby particles contained in the exhaust gas become trapped in the filtering walls.

It is a disadvantage of the conventional particulate filter that inhomogenous formation of deposits may occur, in particular at the end of exhaust gas channels which are closed at the exit side, and that an inhomogenous temperature profile in the particulate filter may occur, which leads to an inhomogenous regeneration of the particulate filter.

It is a further disadvantage that the manufacturing of a conventional particulate filter, having exhaust gas channels being alternately closed and open, is relatively difficult.

SUMMARY OF THE INVENTION

The present invention has been accomplished taking the above problems into consideration.

It is therefore an object of the present invention to provide an improved exhaust gas cleaning apparatus and a method for manufacturing an exhaust gas cleaning apparatus.

The invention provides an exhaust gas cleaning apparatus for cleaning an exhaust gas emitted from a combustion engine, wherein the exhaust gas cleaning apparatus comprises a stack of plural material layers successively arranged on each other in a stacking direction, wherein the material layers are made of a porous material being permeable to the exhaust gas, wherein the stack has an entry side and an exit side; wherein plural exhaust gas flow channels are defined in the stacking direction between two adjacent material layers in the stack; wherein the exhaust gas flow channels are defined by surfaces of the material layers which have, when viewed in a flow direction of the exhaust gas from the entry side to the exit side, a plurality of concave and convex areas; wherein a first group of exhaust gas flow channels is formed to be open at the entry side of the stack and closed at the exit side thereof; wherein a second group of exhaust gas flow channels is formed to be closed at the entry side of the stack and open at the exit side thereof; and wherein exhaust gas flow channels of the first and second groups are alternately arranged in the stacking direction.

A separation of particulates is achieved by forcing the particulates through the porous material layers, which are permeable to the exhaust gas, in a direction from an exhaust gas flow channel open on its entry side to an exhaust gas flow channel open on its exit side.

It is an advantage of the present invention that a turbulent through flow of the exhaust gas through the particulate filter is caused by the concave and convex surface areas of the material layers. Thereby, a uniform deposition of particulates on the filtering material layers is achieved and a local clogging is avoided. The advantageous turbulent through flow is achieved by forcing the exhaust gas on a zig-zag like flow path by means of the concave and convex surface areas.

The material layers may have a catalytic coating, such that, since the deposition on the material layers is uniform, also a homogenous regeneration of the material layers is caused.

In an exemplary embodiment of the invention there are formed continuous wave crests and continuous wave troughs are formed by the concave and convex surface areas. This leads to a relatively increased stability of the material layers which has a positive effect in view of mechanical stress, e.g. caused by exhaust gas pulsations, of the entire particulate filter.

According to an exemplary embodiment, the the wave crests and wave troughs extend substantially linearly in a plane of the material layer. Thereby the material layers are particularly rigid.

According to an another exemplary embodiment, the wave crests and the wave troughs of a first material layer of the stack extend in a first direction, wherein the wave crests and the wave troughs of a second material layer adjacent to the first material layer in the stack extend in a second direction oriented under an angle of more than 10° with respect to the first direction. Thereby a particularly effective turbulence of the exhaust gas is caused between the material layers.

According to a further exemplary embodiment, the stack comprises first and second material layers which are directly adjacent to each other in the stacking direction, the first and second material layers contacting each other at a plurality of contact points. This leads to a flat support of the material layers with respect to each other, such that the particulate filter on the whole is relatively stable in view of mechanical strains, e.g. caused by exhaust gas pulsations originating from the combustion engine.

In a further embodiment of the invention at least one of the exhaust gas flow channels of the first group is defined by two material layers contacting each other along a line at the exit side of the stack, the line being oriented transversely to the flow direction.

According to an exemplary embodiment, at least one of the exhaust gas flow channels of the second group is defined by two material layers contacting each other along a line at the entry side of the stack, the line being oriented transversely to the flow direction. Thereby, the sealing of exhaust gas flow channels is improved at the entry side and at the exit side, respectively.

In a further embodiment of the invention, the material layers contacting each other along the line are joined together along the line by at least one of adhering, welding and folding. These types of joining are a particularly simple and efficient way to seal the exhaust gas flow channels at the entry side and at the exit side, respectively.

According to an exemplary embodiment, at least one web is provided, which is extending transversely to the flow direction and joining two material layers defining the exhaust gas flow channels of the first group at the exit side of the stack.

According to a further exemplary embodiment, at least one web is provided, which is extending transversely to the flow direction and joining two material layers defining one of the exhaust gas flow channels of the second group at the entry side of the stack.

According to another exemplary embodiment, the web is formed of the material and integral with the two material layers. This is a particularly efficient way to seal the exhaust gas flow channels at their entry sides and exit sides, respectively.

In a further embodiment of the invention at least one spacer is disposed between two adjacent material layers in the stack. Thereby a constant distance is provided between the material layers such that the through flow through the particulate filter is particularly uniform.

According to an exemplary embodiment, the spacer is made of a corrugated flat material.

According to another exemplary embodiment, exhaust gas flow channels of the first group have a larger cross section than the exhaust gas flow channels of the second group.

Advantageously, an average distance between two adjacent material layers in the stack is in a range from about 0.5 mm to about 8.0 mm, particularly from about 1.0 mm to about 4.0 mm, and more particularly from about 1.5 mm to about 3.0 mm. The average distance between adjacent material layers is the distance between (fictional) average planes of the material layers.

According to an exemplary embodiment, an amplitude of deviations of the concave and convex surface areas of at least one of the material layers from an average plane of the at least one material layer is more than about 1 mm.

According to a further exemplary embodiment, an amplitude of deviations of the concave and convex surface areas of at least one of the material layers from an average plane of the at least one material layer is less than about 7 mm, particularly less than about 5 mm and more particularly less than about 3 mm.

According to another exemplary embodiment, a lateral distance between the convex areas of at least one material layer is more than about 2 mm, particularly more than about 3 mm.

According to an exemplary embodiment, a lateral distance between the convex areas of at least one material layer is less than about 7 mm, particularly less than about 5 mm.

According to another exemplary embodiment, a thickness of the material layers is more than about 0.1 mm, particularly more than about 0.3 mm.

According to a further exemplary embodiment, a thickness of the material layers is less than about 2.0 mmm, particularly less than about 1.2 mm.

In a further embodiment of the invention the porous material comprises a material made of fibres.

In a further embodiment of the invention the porous material comprises at least one of a gauze, a fleece and a fabric.

According to an exemplary embodiment, the fibres comprise at least one of metallic fibres and ceramic fibres.

In another embodiment of the invention the porous material comprises at least one of a material made of a powder, a material made of a foam and a material made of a sintered body.

In a further embodiment of the invention the porous material comprises a catalytic material comprising at least one of a noble metal, a metal oxide, a compound oxide, and an oxygen storing material comprising at least one of a cerium and a cerium oxide. Thereby the exhaust gas cleaning apparatus may be used simultaneously as a catalyst, in order to convert the pollutants HC, CO, and $NO_x$, which are emitted from the combustion engine during operation, into the harmless substances $H_2O$, $CO_2$, and $N_2$ by use of appropriate catalyst materials. Thereby soot, which deposits on or/and in the porous material layers, is combusted by the catalytic effect of the catalyst materials. The use of the exhaust gas cleaning apparatus is particularly advantageous in conjunction with the catalytic coating, i.e. a regeneration of the exhaust gas cleaning apparatus is particularly effective due to the homogonous through flow through the exhaust gas cleaning apparatus by means of the convex and the concave surface areas. There is no formation of larger soot deposits due to this particular through flow, and the catalytic material may efficiently convert the pollutants.

In a further embodiment of the invention, at least one fibre material layer defining the stack at a side surface thereof extending between the entry side and the exit side of the stack.

According to an exemplary embodiment, the at least one fibre material layer surrounds the stack at all side surfaces thereof extending between the entry side and the exit side of the stack.

In a further embodiment of the invention at least one of the exhaust gas flow channels is defined by the mat in a direction transverse to the extension direction of the stack. In addition to the lateral sealing of the exhaust gas flow channels by means of the fibre material mat, this arrangement also supports the exhaust gas cleaning apparatus simply by wedging the exhaust gas cleaning apparatus and the fibre material mat into the body, without the necessity of a joining connection.

According to an exemplary embodiment, that the fibre material mat comprises a ceramic fibre material layer or/and a metallic fibre fleece layer. A more uniform flat pressure of the fibre material layer is achieved by firstly wrapping a metallic fibre fleece layer around the exhaust gas cleaning apparatus followed by embedding in a fibre material layer. It is avoided that the ceramic fibre material layer is damaged by individual protruding material layers of the exhaust gas cleaning apparatus.

In a further aspect the present invention comprises an exhaust gas cleaning apparatus for cleaning the exhaust gas of a combustion engine, wherein the exhaust gas cleaning apparatus comprises: a stack of plural material layers successively arranged on each other in a stacking direction, wherein the material layers are made of a porous material being permeable to the exhaust gas, wherein the stack has an entry side and an exit side; wherein plural exhaust gas flow channels are defined in the stacking direction between two adjacent material layers in the stack; wherein a first group of exhaust gas flow channels is formed to be open at the entry side of the stack and closed at the exit side thereof; wherein a second group of exhaust gas flow channels, is formed to be closed at the entry side of the stack and open at the exit side thereof; wherein exhaust gas flow channels of the first and second groups are alternately arranged in the stacking direction; and wherein at least one of the exhaust gas flow channels of the first group open has, at the entry side of the stack, a cross section which is larger than a cross section of at least one of the exhaust gas flow channels of the second group at the exit side of the stack.

According to an exemplary embodiment, substantially all of the exhaust gas flow channels of the first group have, at the entry side of the stack, cross sections which are larger than cross sections of substantially all of the exhaust gas flow channels of the second group at the exit side of the stack.

According to a further exemplary embodiment, the exhaust gas flow channels of at least one of the first group and the second group have substantially constant cross sections along substantially an entire length thereof.

In a further aspect the present invention comprises an exhaust gas cleaning apparatus for cleaning the exhaust gas emitted from a combustion engine, wherein the exhaust gas cleaning apparatus comprises: a stack of plural material layers successively arranged on each other in a stacking direction; wherein the material layers are made of a porous material being permeable to the exhaust gas; wherein the stack has an entry side and an exit side; wherein plural exhaust gas flow channels are defined in the stacking direction between two adjacent material layers in the stack; wherein a first group of exhaust gas flow channels is formed to be open at the entry side of the stack and closed at the exit side thereof; wherein a second group of exhaust gas flow channels is formed to be closed at the entry side of the stack and open at the exit side thereof; wherein exhaust gas flow channels of the first and second groups are alternately arranged in the stacking direction; and wherein at least one of the exhaust gas flow channels of the first group has a cross section which continuously increases from the entry side to the exit side of the stack, and wherein at least one of the exhaust gas flow channels of the second group has a cross section which continuously decreases from the entry side to the exit side of the stack.

It is thereby achieved, that the exhaust gas flows uniformly in the exhaust gas flow channels open at their entry side at all locations of the filtering material layers forming the exhaust gas flow layer, and that an (exhaust gas) mass flow decreases in the exhaust gas flow channels open at their entry side along the flow direction and that, accordingly, the mass flow increases in the exhaust gas flow channels open at their exit side in the flow direction. When the local mass flow changes according to the cross sections of the exhaust gas flow channels, then it follows a more uniform velocity along each exhaust gas flow channel. Thus, in turn, it follows a more uniform pressure distribution and therefore a more uniform distribution of a pressure difference along the length of the exhaust gas flow channels (due to the path of the exhaust gas from one exhaust gas flow channel to an adjacent exhaust gas flow channel) between two exhaust gas flow channels being open at their entry side and exhaust gas flow channels being open at their exit side. Thus it follows a more uniform distribution of the local mass flow across the filtering material layers and therefore a more uniform usage of the filtering material layer surface and a more uniform soot layer thickness in the exhaust gas flow channels being open at their entry side.

According to an exemplary embodiment, substantially all of the exhaust gas flow channels of the first group have a cross section which continuously increases from the entry side to the exit side of the stack, and wherein at least one of the exhaust gas flow channels of the second group has a cross section which continuously decreases from the entry side to the exit side of the stack.

In a further aspect, the present invention comprises an exhaust gas cleaning apparatus for cleaning an exhaust gas of a combustion engine, wherein the exhaust gas cleaning apparatus comprises: a housing; a stack of plural material layers successively arranged on each other in a stacking direction, the stack being disposed in the housing; wherein the material layers are made of a porous material being permeable to the exhaust gas; wherein the stack has an entry side and an exit side; wherein plural exhaust gas flow channels are defined in the stacking direction between two adjacent material layers in the stack; wherein a first group of exhaust gas flow channels is formed to be open at the entry side of the stack and closed at the exit side thereof; wherein a second group of exhaust gas flow channels, is formed to be closed at the entry side of the stack and open at the exit side thereof; wherein exhaust gas flow channels of the first and second groups are alternately arranged in the stacking direction; and wherein a mat made of the material which is permeable to the exhaust gas is disposed between a wall of the housing and the stack, and wherein at least one of the exhaust gas flow channels is defined by the mat in a direction transverse to the stacking direction. Thereby a lateral sealing of the exhaust gas flow channels is advantageously achieved, without the necessity of joining the exhaust gas flow channels in a complicated way, e.g. by welding.

In a further aspect, the present invention comprises a method for manufacturing an exhaust gas cleaning apparatus for cleaning an exhaust gas emitted from a combustion engine, wherein the method comprises the following steps: providing a material sheet made of a porous material which is permeable to the exhaust gas; folding a material sheet made of a porous material along folding lines, wherein the porous material is permeable to the exhaust gas, wherein the folding lines extend transversely to a direction of extension of the material sheet, and wherein the folding lines are disposed at a distance from each other in the direction of extension of the material sheet; layering sections of the folded material sheet on each other such that a stack is formed; mounting the stack within a housing, the housing comprising an entry opening for the exhaust gas entering an interior of the housing and an exit opening opposite the entry opening for cleaned exhaust gas leaving the housing, wherein the stack is disposed in the housing such that a first group of folding lines of the stack faces towards the entry opening and a second group of folding lines of the stack faces towards the exit opening, and such that the stack is sealed with respect to the housing such that substantially every possible path of the exhaust gas from the entry opening to the exit opening traverses the material sheet at least one time. Thus, a particulate filter stack is provided in a simple way having alternately closed and open exhaust gas flow channels, respectively, without having to cut individual material sheet portions, whereby a particularly advantageous method of manufacturing is achieved.

In a further exemplary embodiment of the invention, the folding comprises passing the material sheet between two embossing rolls during folding for generating deformation areas along the folding lines. The deformation areas particularly improve the folding of the material sheet.

According to an exemplary embodiment, the folding comprises pressing a portion of the material sheet into at least one longitudinal recess provided on a first roll of the two embossing rolls by a corresponding protrusion provided on a second roll of the two embossing rolls.

According to an exemplary embodiment, the at least one longitudinal recess of the first roll extends substantially parallel to an axis of rotation of the first roll, and wherein the at least one protrusion of the second roll extends substantially parallel to an axis of rotation of the second roll.

According to another exemplary embodiment, the method comprises corrugating the material sheet using the two embossing rolls.

In a further exemplary embodiment, the method comprises corrugating the material sheet using recesses and protrusions provided on a surface of the first roll and the second roll, the recesses and protrusions being adjacent in a circumferential direction of the rolls, wherein the recesses and protrusions extend spirally around the axes of rotation of the two embossing rolls.

According to another exemplary embodiment, an even number of circumferential areas is provided on the first roll and the second roll, respectively, wherein the areas are defined in a circumferential direction by a longitudinal protrusion and by a longitudinal recess, respectively, and wherein orientations of the spiral protrusions and recesses in adjacent circumferential areas in the circumferential direction are inverse to each other.

According to an exemplary embodiment, spacers are provided between adjacent sections of the material sheet when the material sheet is layered to a stack.

According to another exemplary embodiment, that the spacer comprises a corrugated flat material, wherein the wave crests and wave troughs extend in the extension direction of the material sheet.

According to a further exemplary embodiment, that a mat made of at least one of a fibre material, a fibre fleece material and a ceramic material is inserted between the housing and the stack. As was mentioned above, the exhaust gas cleaning apparatus is supported by this arrangement, in addition to the lateral sealing of the exhaust gas flow channels by the fibre material mat, simply by wedging the exhaust gas cleaning apparatus and the fibre material mat into the body, without the necessity of a joining connection.

BRIEF DESCRIPTION OF THE DRAWINGS

The forgoing as well as other advantageous features of the invention will be more apparent from the following detailed description of exemplary embodiments of the invention with reference to the accompanying drawings, wherein.

DETAILED DESCRIPTION OF EXEMPLARY EMBODIMENTS

Figure 1:
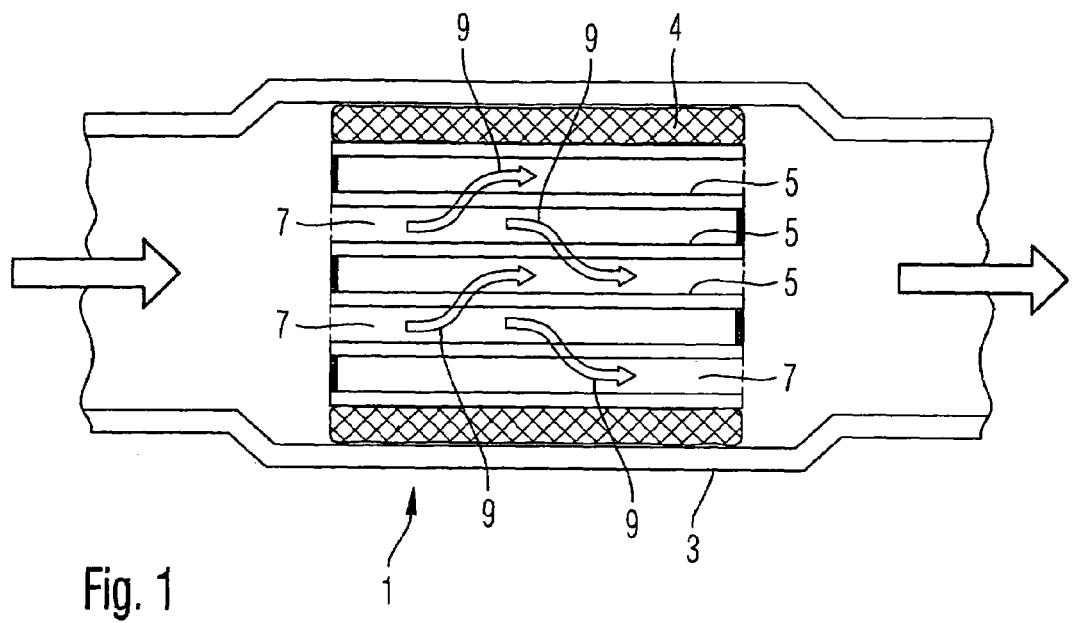
FIG. 1 shows a conventional particulate filter.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

Figure 2:
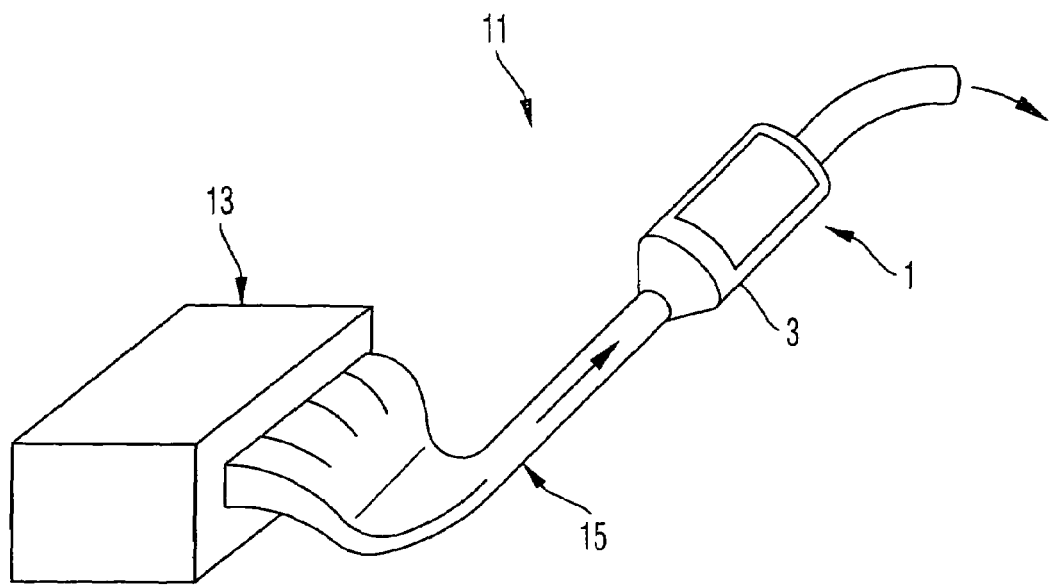
FIG. 2 shows a schematic presentation of a first embodiment of an inventive exhaust gas cleaning apparatus in the exhaust gas duct of a motor vehicle.

FIG. 2 shows schematically an exhaust gas cleaning system 11, which is typically used in e.g. passenger cars. This exhaust gas cleaning system 11 is used for treatment of exhaust gases emitted from a combustion engine 13 symbolically shown, wherein the exhaust gas produced by the combustion engine 13 is emitted via an exhaust gas duct 15 into the environment, and wherein the exhaust gas duct 15 comprises an exhaust gas cleaning apparatus, i.e. a particulate filter 1, which is arranged in a body 3, through which the exhaust gas flows. The particulate filters discussed in this document are particularly suited for combustion engines operated with diesel fuel.

A catalytic converter (not shown), for example an oxidation catalyst, may be, when viewed in the flow direction of the exhaust gas, arranged before as well as after the particulate filter 1 for pre-treatment and after-treatment, respectively, in the same body 3. The hydrocarbons as well as carbon monoxide are oxidised by means of the catalyst at temperatures above 200° C. The function of the particulate filter is then to retain exhaust gas particles remaining in the exhaust gas by the particulate filter 1.

Figure 3:
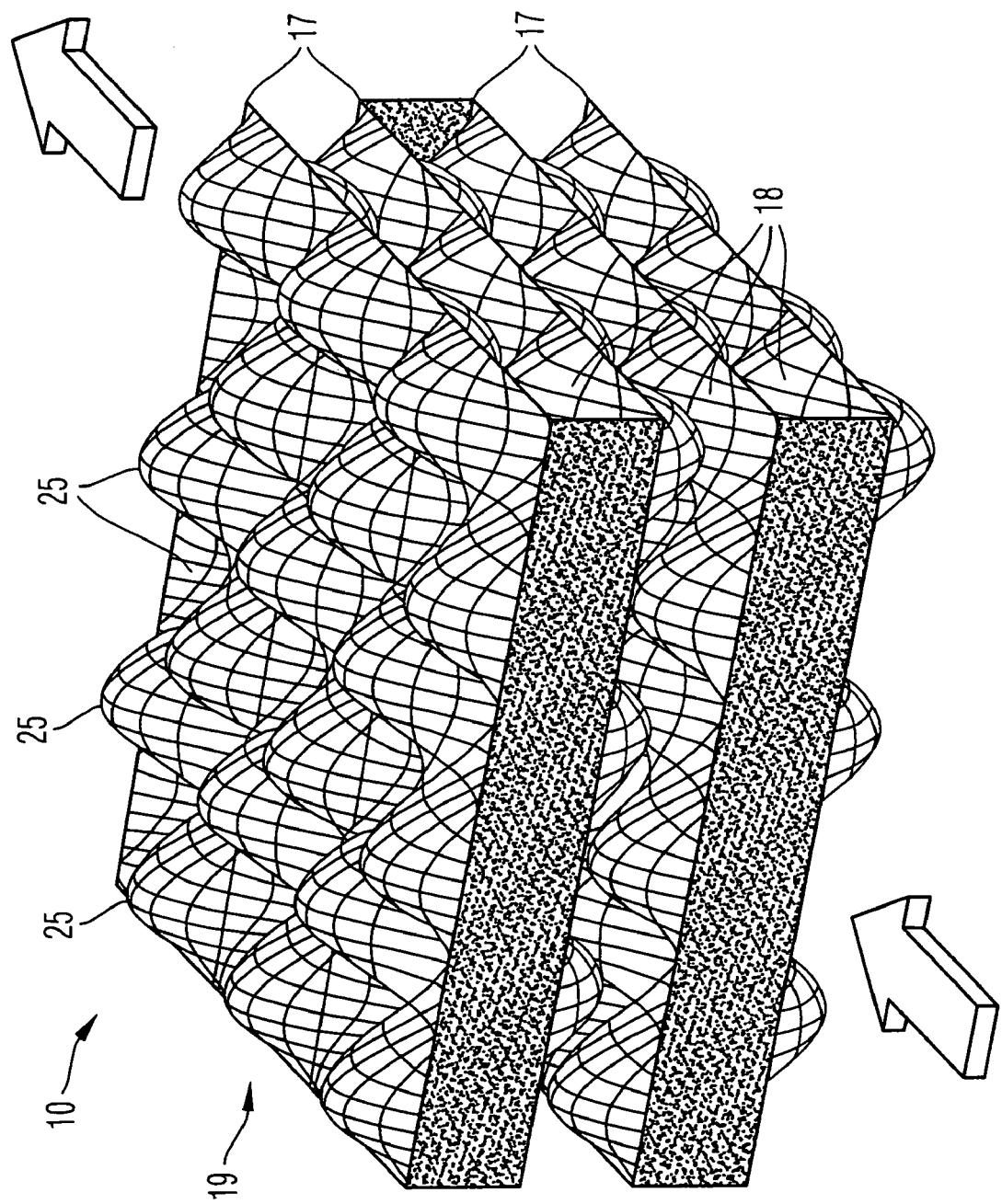
FIG. 3 shows a detailed perspective view of the exhaust gas cleaning apparatus according to FIG. 2.

FIG. 3 shows a detailed view of the particulate filter 10 which is arranged in the exhaust gas duct 15 shown in FIG. 2. There is a plurality of material layers 17 made of a porous material being permeable to the exhaust gas arranged on top of each other to form a material layer stack 19, so that two adjacent material layers form an exhaust gas flow channel 18. It may be seen in FIG. 3 that the exhaust gas flow channels 18 are alternately closed (dark bar) and open, respectively, at an entry side and at an exit side of the stack 19 (entry side and exit side with reference to the exhaust gas flow direction, see arrows). Thereby the exhaust gas is forced to pass through the material layers 17, whereby the effect of retaining or filtering the particulates is achieved.

In this case the material of the layer comprises a sintered metallic fleece material having a fibre cross section of about 10 μm. However, the fibre cross section, the porosity and the thickness of the material may be adapted to the particulates to be filtered. One must observe that larger fibre cross sections cause larger distances between the fibres and therefore the degree of separation of the particulates deteriorates. The filtering in areas close to the surface may be achieved by particularly fine structures, whereas coarser structures cause filtering across a larger depth of the material.

It is also possible to arrange layers of different fibre material, having different fibre size, on top of each other. If for instance at first a more coarse structure following a finer structure is arranged in the filtering direction, then deep-filtering may be achieved in the more coarse structure, whereas the finer structure arranged behind the more coarse structure filters even finest particulates. Another advantage of an additional fibre layer material is the increase in stability of the material layers and therefore of the entire particulate filter. However, other materials may be used to form the material layers as well, e.g. ceramics, powder materials or foams. It is to be noted, however, that the materials are permeable to the exhaust gas.

It is also possible, that the porous material layers are coated with a catalytic material in order to achieve a particularly effective exhaust gas purification. This catalytic material may comprise one or more noble metals, oxides of base metals or/and compound oxides, as a combination of several oxides, or combinations of these three groups of materials. It is the function of the catalytic material to convert the pollutants HC and CO emitted during operation of the combustion engine by use of this catalytic material into the harmless substances $H_2O$ and $CO_2$. The reaction of $NO_2$ is also promoted wherein $NO_2$ promotes an oxidation of carbon, i.e. soot, already at low temperatures. A detailed discussion of this so called CRT principle (Continuously Regenerating Trap) may be found in the European patent application EP 0 835 684.

In order to fix the stack of material layers 19 in the body 3 to avoid displacement due to the exhaust gas flow, the stack may be wrapped in e.g. one or more wire- or fibre mats, which are wedged between the stack and the body. Also, pins which are protruding into the stack from the sides are suitable to provide a fixation of the stack.

Figure 4:
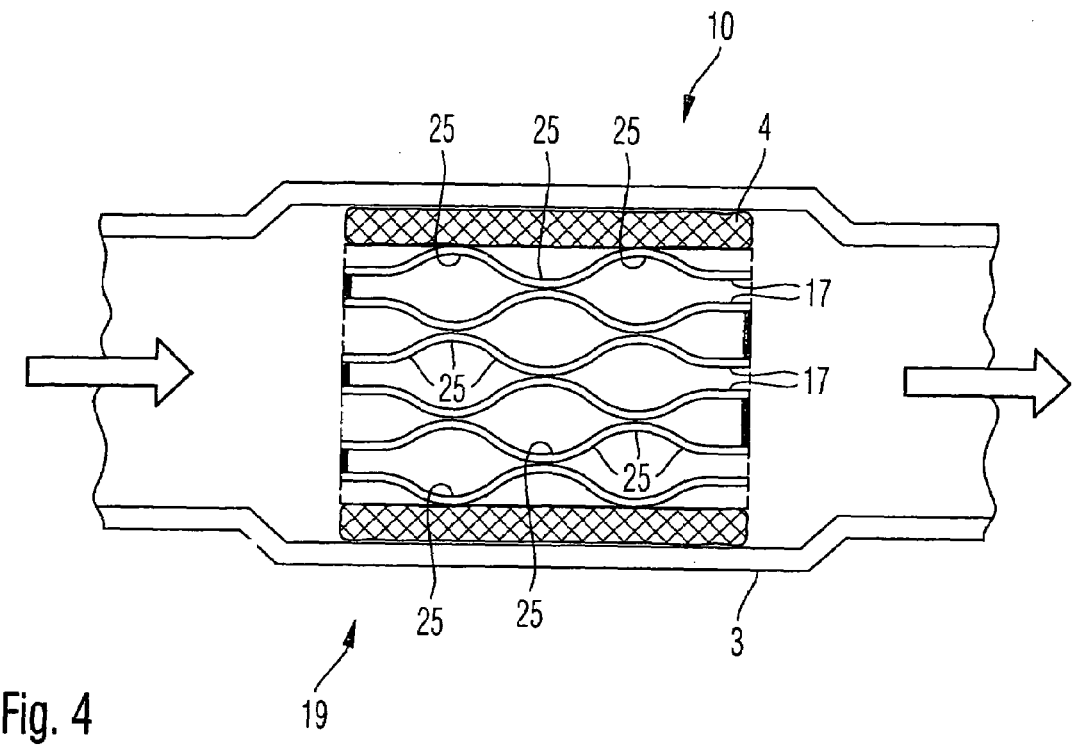
FIG. 4 shows a cross section of an exhaust gas cleaning apparatus according to a second embodiment of the invention.

FIG. 4 shows a cross sectional view of the particulate filter 10 shown in FIGS. 2 and 3, respectively. In the Figures the particulate filter 10 is mounted into the body 3 wherein the particulate filter 10 is fixed by embedding it in a fibre mat 4 to avoid displacement and to protect it from vibrations.

In the following, alternatives of the embodiment shown in FIG. 3 are discussed. Here, components, which correspond to components shown in FIG. 3 with respect to their arrangement and their function carry the reference numbers used in FIG. 3, wherein an additional letter is added for distinction. Reference is made to the entire previous discussion.

Figure 5:
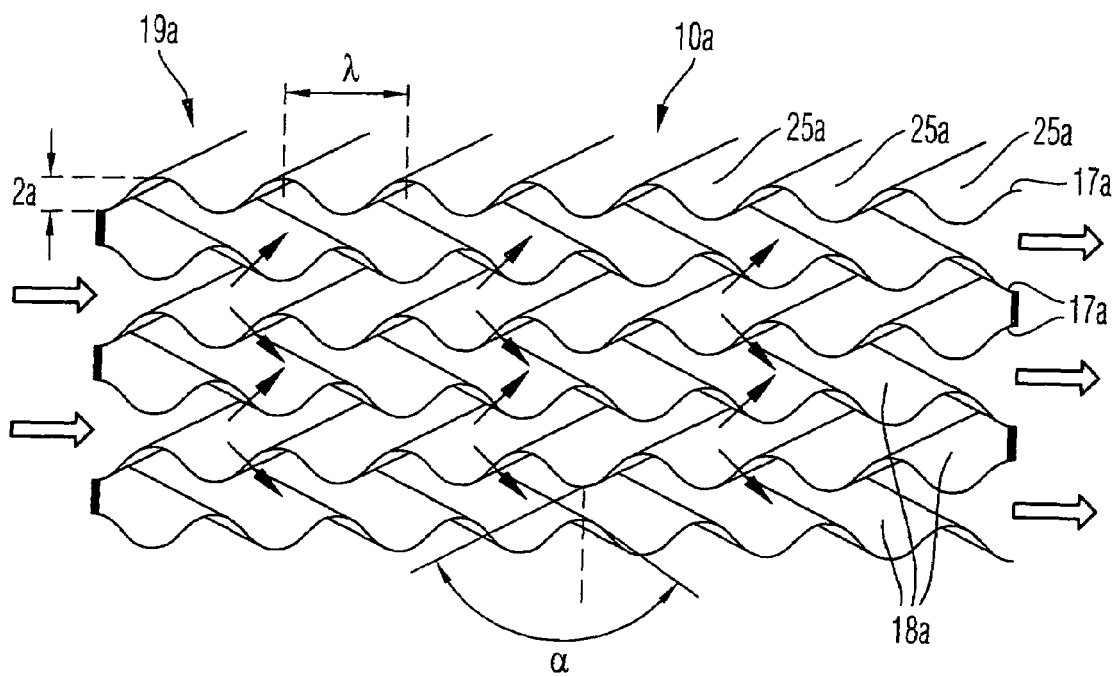
FIG. 5 shows a perspective cross sectional view of the exhaust gas cleaning apparatus shown in FIG. 4.

FIG. 5 shows a perspective longitudinal cross section of a particulate filter 10a, which is a second embodiment of the present invention.

In this embodiment the concave and convex surface areas 25a of the material layers 17a form continuous wave crests and wave troughs which expand substantially linearly. Wave crests and wave troughs of adjacent material layers 17a form an angle α between each other, the angle of which is about 70° in the example shown. A distance λ, i.e. a wave length, between two adjacent wave crests (wave troughs, respectively) is 2 mm, and a maximum deviation 2a of the wave crests and -troughs is 1 mm. By appropriate selection of a ratio of λ and a (relative wave length λ/a) a particular rigidity of the particulate filter structure may be achieved.

In FIG. 5 the material layers 17a are shown having a distance from each other in a stack 19a. However, the material layers 17a may be on top of each other in order to provide the particulate filter 10a with a particular stability by means of a plurality of contact points between wave crests and -troughs of adjacent material layers.

As can be seen in FIG. 5, exhaust gas flow channels 18a formed by adjacent material layers 17a are alternately closed at their entry side and open at their exit side, and open at their entry side and closed at their exit side, respectively, in order to force the exhaust gas to flow through the material layers 17a.

Figure 6:
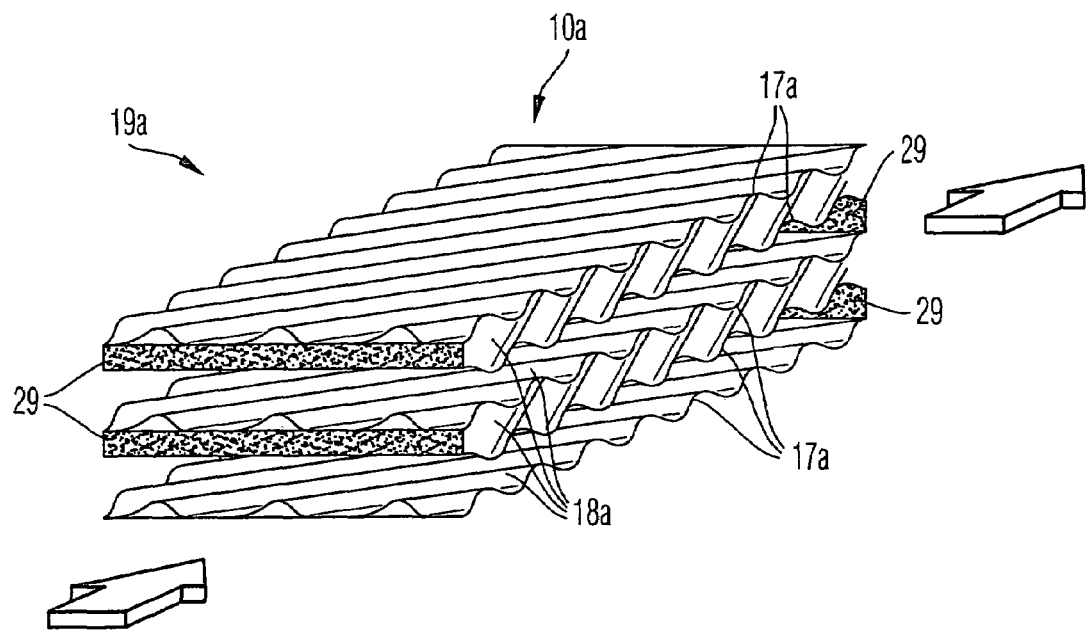
FIG. 6 shows a perspective view of a second embodiment of the exhaust gas cleaning apparatus.

FIG. 6 shows a perspective view of the particulate filter 10a shown in FIG. 5. First of all, it can be seen that adjacent material layers 17a are connected to each other by a continuous web extending transversely to the flow direction at the entry side and at the exit side, so that the exhaust gas flow channels 18a are alternately closed at their entry side and open at their exit side, and open at their entry side and closed at their exit side, respectively. In the example shown, the webs 29 are welded to the material layers 17a.

Figure 7:
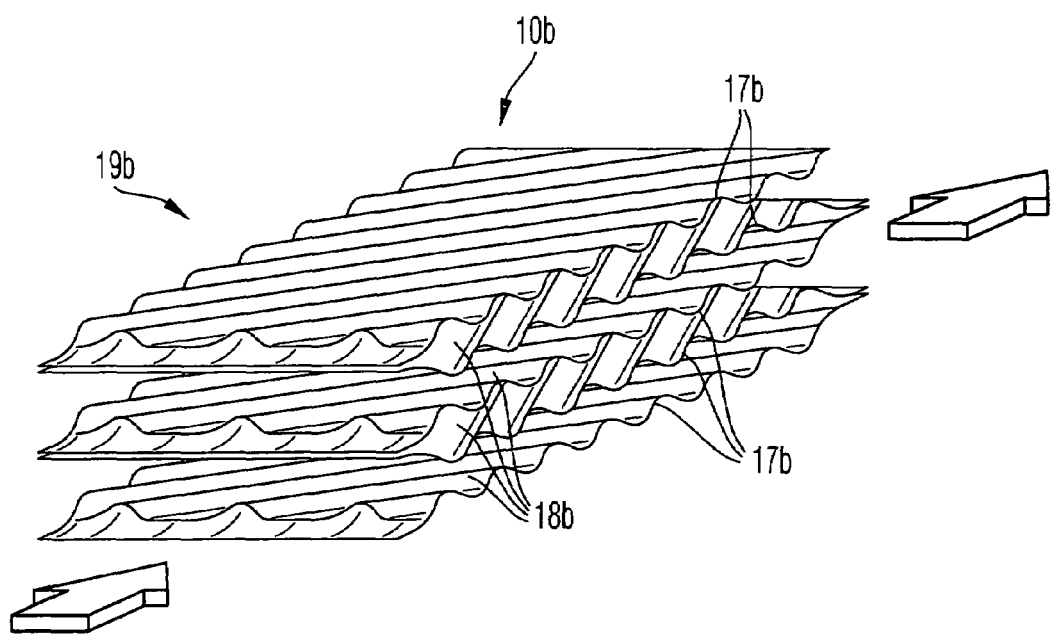
FIG. 7 shows a perspective view of a third embodiment of the exhaust gas cleaning apparatus.

FIG. 7 shows a perspective view of a particulate filter 10b, which is a third embodiment of the present invention.

The webs 29 shown in FIG. 6 are replaced in the particulate filter 10b shown in FIG. 7 by two adjacent material layers 17b of a stack 19b alternately connected to each other at the entry side and the exit side, respectively, by adhering or welding (e.g. seam welding), whereby exhaust gas flow channels 18b are again alternately closed at the entry side and open at the exit side, and open at the entry side and closed at the exit side, respectively.

It is possible, that the material layers 17b may also be, in addition to adhering, connected to each other by folding, or only by folding. For this, one end of a material layer, which is to be connected to an end of another material layer, is wrapped around the end of the other material layer, and is then clinchingly pressed to the other end.

Figure 8:
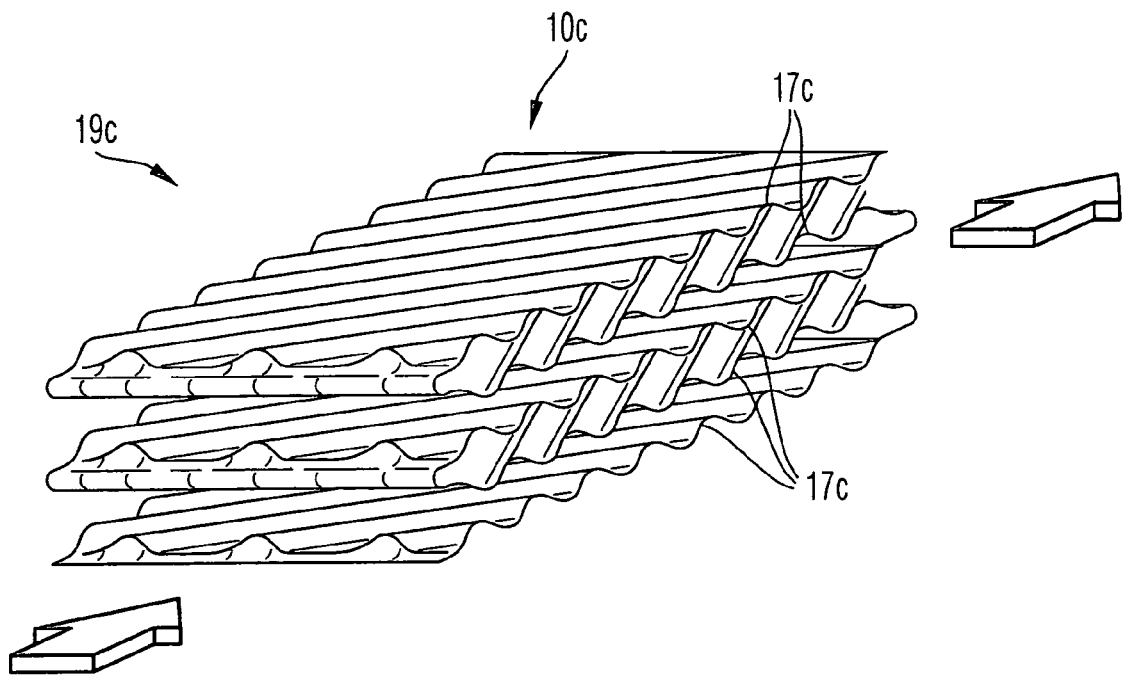
FIG. 8 shows a perspective view of a fourth embodiment of the exhaust gas cleaning apparatus.

FIG. 8 shows a perspective view of a particulate filter 10c, which is a fourth embodiment of the present invention.

Two adjacent material layers 17c of a stack 19c are connected to each other integrally at the entry side and exit side, respectively, in this particulate filter 10c, by means of folding a material sheet.

FIGS. 9 to 12 show perspective views of particulate filters 10d, 10e, 10f and 10g, which are manufactured in accordance to an inventive method.

According to the method, a material sheet 17d made of a porous material being permeable to the exhaust gas is folded at fictional folding lines 31 which extend transversely to an extension direction of the material sheet 17d.

Then, the thus folded material sheet is layered in sections so that a stack 19d is formed. By this layering, exhaust gas flow channels 18d are provided. As in the previous embodiments, these exhaust gas flow channels 18d are alternately closed at the entry side and open at the entry side, and open at the entry side and closed at the exit side, respectively.

Then, spacers 32d may be provided between adjacent sections of the material sheet, in order to provide a defined distance between the material sheet sections. In the example shown in FIG. 9 these spacers 32d are made of corrugated sheet metal. Wave-crests and wave-troughs extend in the extension direction of the material sheet. The spacers 32d provide the exhaust gas flow channels 18d for the exhaust gas to be purified and also provide stability to the stack.

Figure 11:
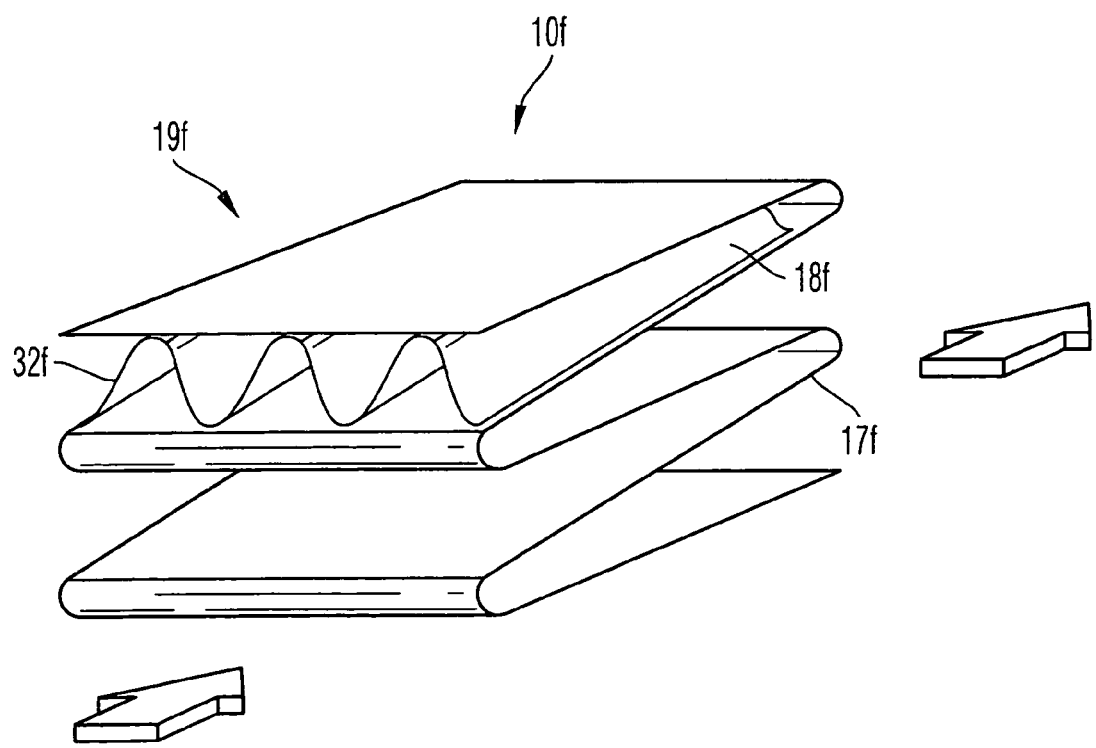
FIGS. 9 to 12 show perspective views of further embodiments of the exhaust gas cleaning apparatus.
Figure 9:
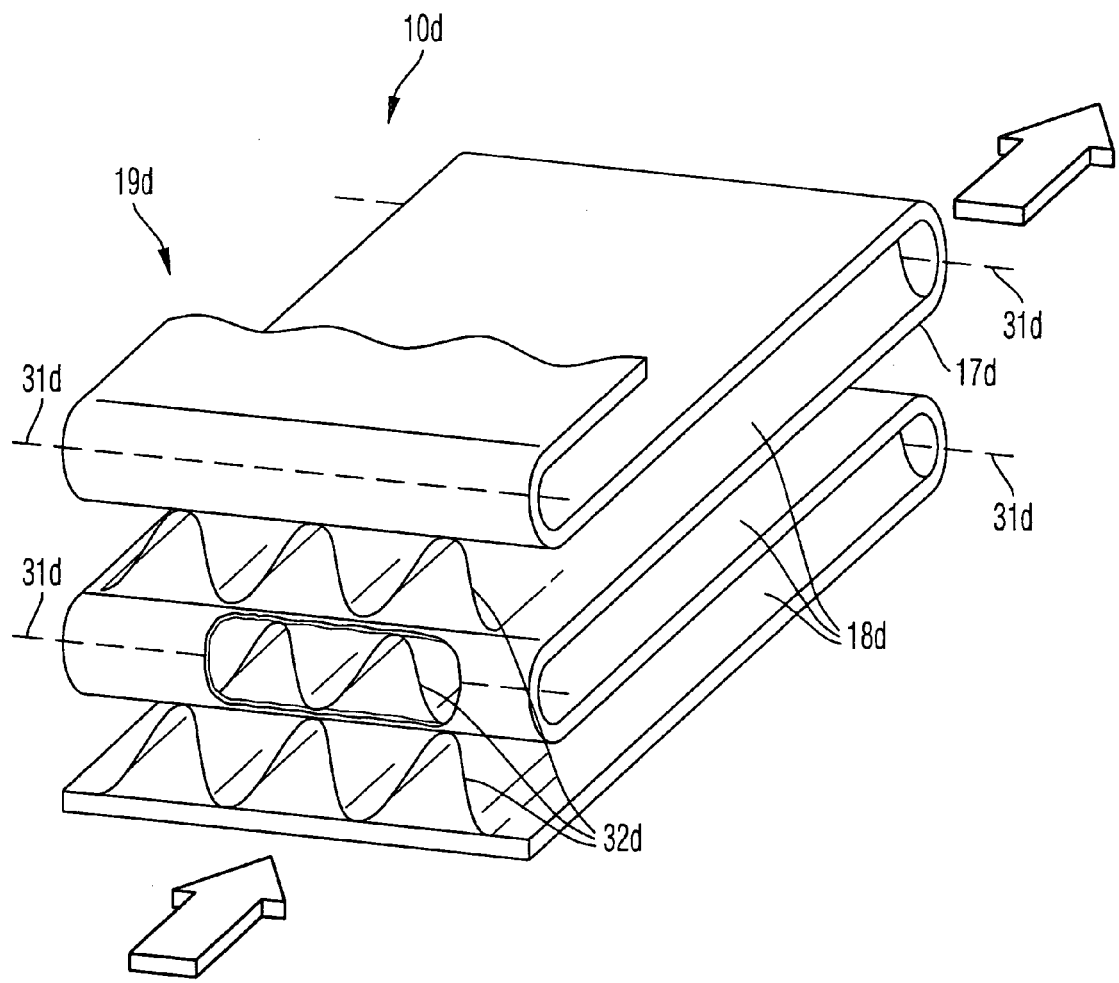
Figure 10:
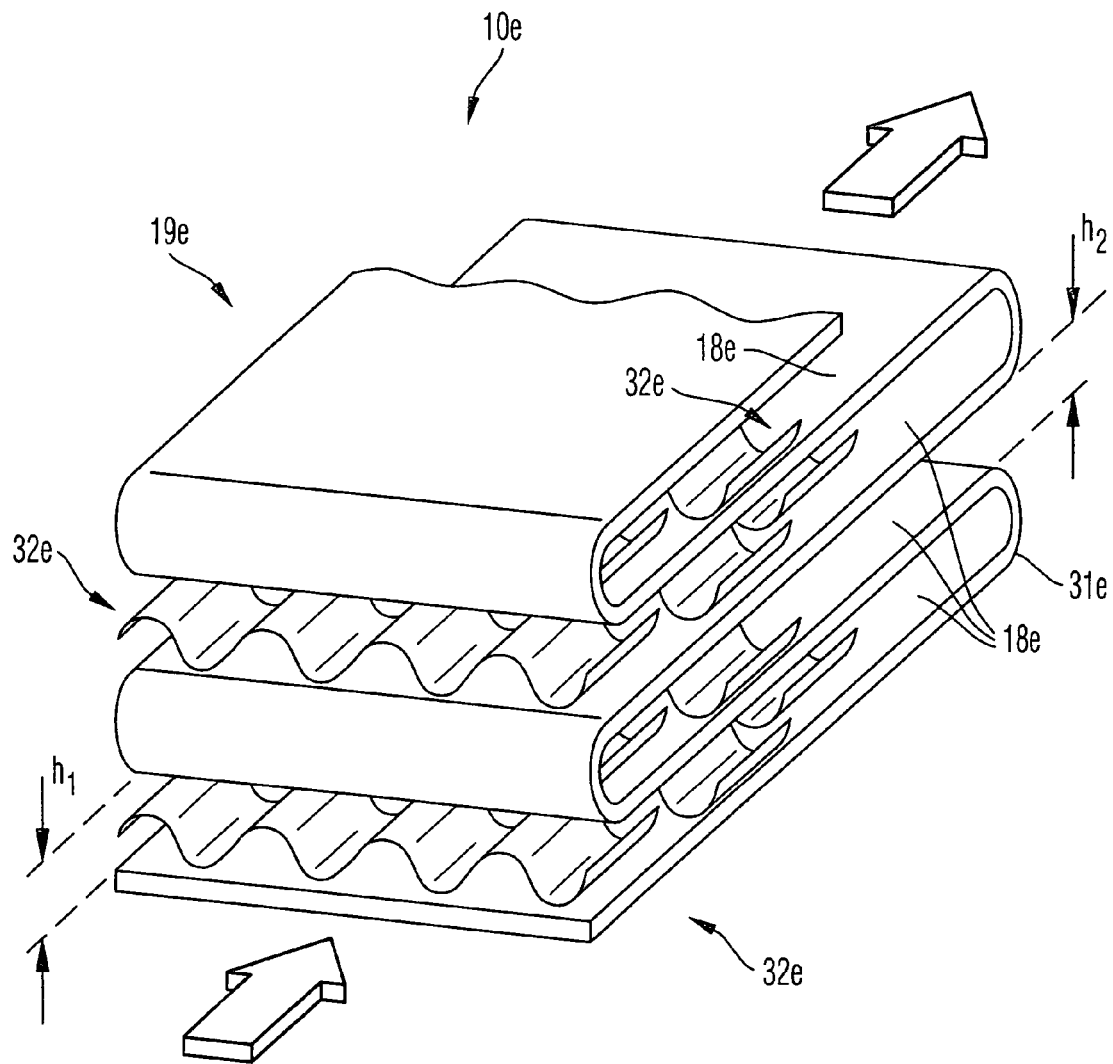

Other examples for spacers are shown in FIGS. 10 and 11.

FIG. 10 shows a particulate filter 10e made of a folded material sheet 17e having spacers 32e arranged in exhaust gas flow channels 18e, wherein the spacers are made of segments of laterally offset corrugated sheet metal, which cause a turbulence in the exhaust gas flow.

It is also evident from FIG. 10 that exhaust gas flow channels 18e, which are open at the entry side, have a larger cross section or height $h_1$, viewed in the longitudinal extension direction of the exhaust gas flow channels 18e, than a cross section or height $h_2$ of an exhaust gas flow channel 18e, which is open at the exit side. By means of the larger cross section $h_1$ it is avoided that the exhaust gas flow channels, which are open at the entry side, become clogged along their length, when soot particles from the exhaust gas deposit in these exhaust gas flow channels. These soot particles may otherwise collect, if the dimensions of the exhaust gas flow channels, which are open at the entry side, are too small, and clog the exhaust gas flow channel continuously along its length.

FIG. 11 shows a particulate filter 10f having a spacer 32f shown exemplary only in one exhaust gas flow channel 18f, wherein the spacer is again made of corrugated sheet metal. The spacer 32f is adapted with respect to its longitudinal cross section to the exhaust gas flow channel 18f, i.e. the spacer 32f is tapered in the extension direction of the exhaust gas flow channel 18f, i.e. from the entry side to the exit side of the stack 19f.

It is also evident from FIG. 11, that the cross section of exhaust gas flow channels, which are open at their exit side, increase in lengthwise direction, according to the cross section, which decreases in lengthwise direction, of exhaust gas flow channels 18f which are open at their entry side. Thereby a homogenous through flow at all locations of the material layers defining the exhaust gas flow channels is achieved, as was discussed above, which causes a more homogenous utilisation of the filtering material layer surface and a more homogenous soot layer thickness in the exhaust gas flow channels being open at their entry side.

Figure 12:
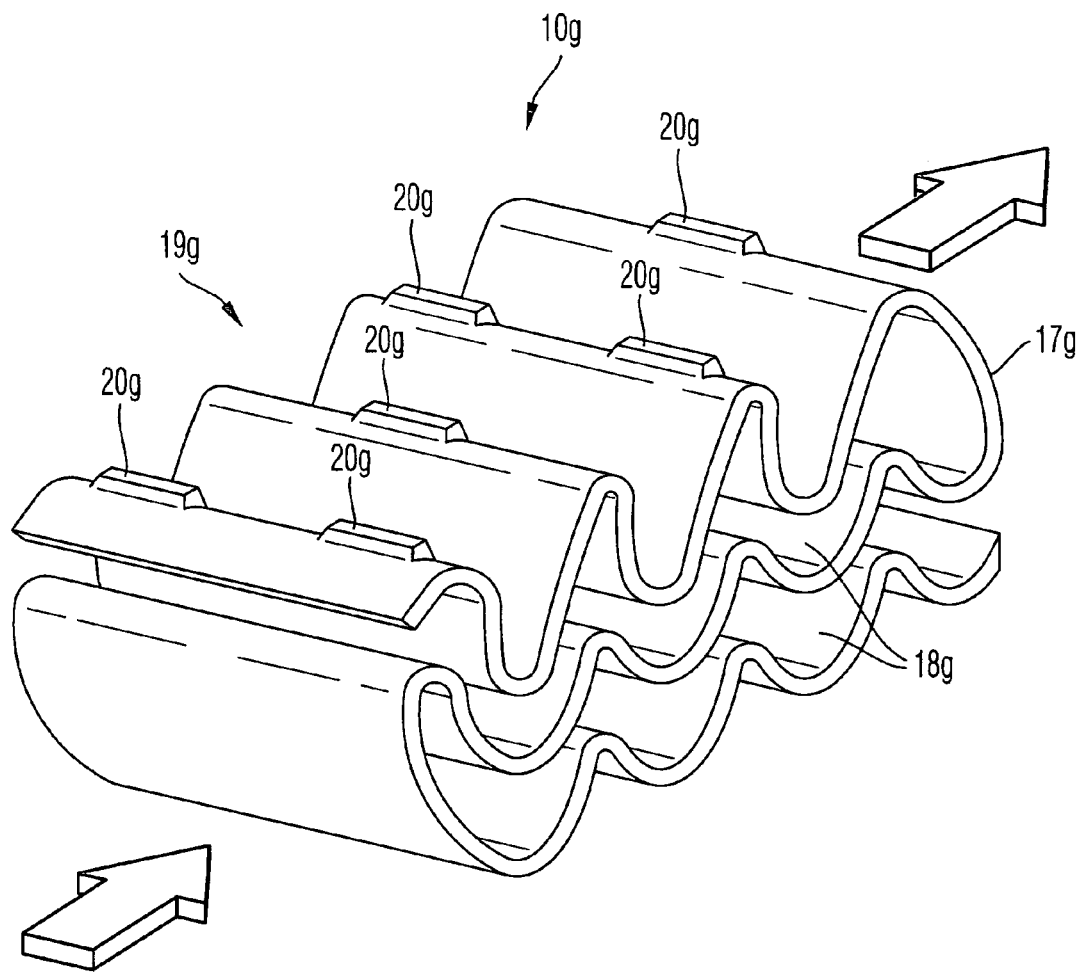

FIG. 12 shows a particulate filter 10g, which, according to the examples shown in FIGS. 10 to 12, is formed from a material sheet 17g by folding. The distance between adjacent material sheet sections is kept constant by protrusions 20 formed in the material sheet 17g.

The entire exhaust cleaning apparatus 10g comprises a corrugation in the extension direction of the material sheet. Accordingly, also the exhaust gas flow channels 18g have a corrugated shape. The filtering effect of the exhaust gas cleaning apparatus 10g is increased, since the filtering surface is increased.

Figure 13:
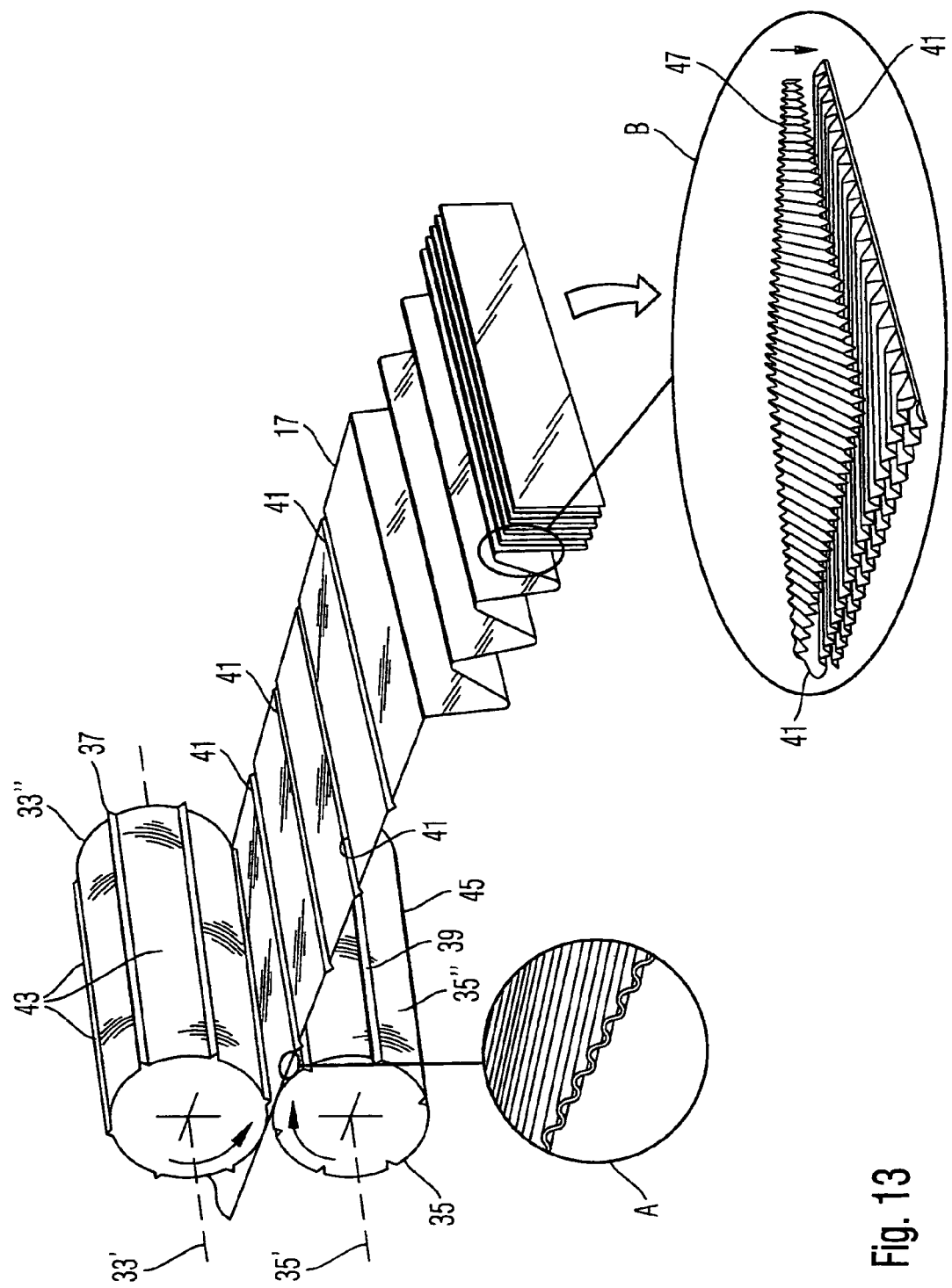
FIG. 13 shows a method for manufacturing an exhaust gas cleaning apparatus.

FIG. 13 shows a method of manufacturing an exhaust gas cleaning apparatus for cleaning an exhaust gas emitted from a combustion engine.

In a first step a material sheet 31 made of a porous material being permeable to the exhaust gas is fed through two embossing rolls 33, 35.

The two embossing rolls 33, 35 are rotatable about an axis 33', 35', respectively, wherein the axes 33', 35' are arranged in parallel to each other.

On the one hand, the embossing roll 33 has a longitudinal protrusion 37 arranged on its surface 33" in parallel to the embossing roll axis 33', and the embossing roll 35 has a longitudinal recess 39 arranged on its surface 35" in parallel to the embossing roll axis 35'. At rotation of the two embossing rolls 33, 35 in an inverse direction to each other (indicated by arrows on the front faces of the rolls) having the material sheet 31 arranged in between, the longitudinal protrusion 37 presses the material sheet 31 at fictional folding lines on the material sheet 31 (folding lines not shown here) into the longitudinal recess 39, in order to form deformation areas 41 in the material sheet 31, at which the material sheet 31 is folded in a second step, so that a material sheet stack is formed.

On the other hand, the embossing roll 33 has adjacent protrusions 43 (only partly shown here) arranged on its surface 33" in the circumferential direction of the embossing roll 33, and the embossing roll 35 has adjacent recesses 45 (here shown only partly) arranged at its surface area 35" in a circumferential direction of the embossing roll 35, wherein the protrusions 43 and the recesses 45 extend spirally around the axis 33', 35' such that at rotation of the two embossing rolls 33, 35 the protrusions 43 press the material sheet 31 into the recesses 45. Thereby the material sheet 31 is formed into a corrugated material sheet 31, as is shown in the sectional enlargement A.

As was mentioned above already, the material sheet 31 thus formed is eventually formed to a material sheet stack 47 by folding.

A detailed view of the material sheet stack shows the sectional enlargement B. It is noted, that the section of the material sheet stack shown is tilted by 90°, so that the sections of the material sheet shown are arranged horizontally. This material sheet stack corresponds to the stack shown in FIG. 9 and the exhaust gas cleaning apparatus 10c, respectively, the discussion of which is referred to here.

As a last step the material sheet stack 47 is mounted in a body, e.g. the body 3 shown in FIG. 4, which is provided with an exhaust gas entry- and an exhaust gas exit-opening (indicated by the arrows in FIG. 4), so that the deformation areas 41 of the material sheet are aligned towards the entry-opening and the exit-opening. Also, the material sheet stack 47 is sealed with respect to the body such that the exhaust gas is forced to flow through the material sheet. This may be achieved e.g. by one or more suitable fibre mats, as is indicated in FIG. 4 by reference number 4, which surround the material sheet stack 47 such that the exhaust gas is forced to flow through the material sheet stack 47.

The present invention has been described by way of exemplary embodiments to which it is not limited. Variations and modifications will occur to those skilled in the art without departing from the scope of the present invention as recited in the appended claims and equivalents thereof.

What is claimed is:

1. An exhaust gas cleaning apparatus for cleaning an exhaust gas emitted from a combustion engine, the apparatus comprising:
   a stack of plural material layers successively arranged on each other in a stacking direction,
   wherein the material layers are made of a porous material being permeable to the exhaust gas,
   wherein the stack has an entry side and an exit side;
   wherein plural exhaust gas flow channels are defined in the stacking direction between two adjacent material layers in the stack;
   wherein the exhaust gas flow channels are defined by surfaces of the material layers which have, when viewed in a flow direction of the exhaust gas from the entry side to the exit side, a plurality of concave and convex areas;
   wherein a first group of exhaust gas flow channels is formed to be open at the entry side of the stack and closed at the exit side thereof;
   wherein a second group of exhaust gas flow channels is formed to be closed at the entry side of the stack and open at the exit side thereof;
   wherein exhaust gas flow channels of the first and second groups are alternately arranged in the stacking direction;
   wherein continuous wave crests and continuous wave troughs are formed by the concave and convex surface areas; and
   wherein the wave crests and the wave troughs of a first material layer of the stack extend in a first direction, wherein the wave crests and the wave troughs of a second material layer adjacent to the first material layer in the stack extend in a second direction oriented under an angle of more than 10° with respect to the first direction.

2. The exhaust gas cleaning apparatus according to claim 1, wherein the wave crests and wave troughs extend substantially linearly in a plane of the material layer.

3. The exhaust gas cleaning apparatus according to claim 1, wherein the stack comprises first and second material layers which are directly adjacent to each other in the stacking direction, the first and second material layers contacting each other at a plurality of contact points.

4. The exhaust gas cleaning apparatus according to claim 1, wherein at least one of the exhaust gas flow channels of the first group is defined by two material layers contacting each other along a line at the exit side of the stack, the line being oriented transversely to the flow direction.

5. The exhaust gas cleaning apparatus according to claim 1, wherein at least one of the exhaust gas flow channels of the second group is defined by two material layers contacting each other along a line at the entry side of the stack, the line being oriented transversely to the flow direction.

6. The exhaust gas cleaning apparatus according to claim 4, wherein the material layers contacting each other along the line are joined together along the line by at least one of adhering, welding and folding.

7. The exhaust gas cleaning apparatus according to claim 5, wherein the material layers contacting each other along the line are joined together along the line by at least one of adhering, welding and folding.

8. The exhaust gas cleaning apparatus according to claim 1, wherein exhaust gas flow channels of the first group have a larger cross section than the exhaust gas flow channels of the second group.

9. The exhaust gas cleaning apparatus according to claim 1, wherein the porous material comprises a material made of fibres.

10. The exhaust gas cleaning apparatus according to claim 9, wherein the porous material comprises at least one of a gauze, a fleece and a fabric.

11. The exhaust gas cleaning apparatus according to claim 9, wherein the fibres comprise at least one of metallic fibres and ceramic fibres.

12. The exhaust gas cleaning apparatus according to claim 1, wherein the porous material comprises at least one of a material made of a powder, a material made of a foam and a material made of a sintered body.

13. The exhaust gas cleaning apparatus according to claim 1, wherein the porous material comprises a catalytic material comprising at least one of a noble metal, a metal oxide, a compound oxide, and an oxygen storing material comprising at least one of a cerium and a cerium oxide.

14. The exhaust gas cleaning apparatus according to claim 1,
wherein at least one of the exhaust gas flow channels of the first group open has, at the entry side of the stack, a cross section which is larger than a cross section of at least one of the exhaust gas flow channels of the second group at the exit side of the stack.

15. The exhaust gas cleaning apparatus according to claim 14, wherein substantially all of the exhaust gas flow channels of the first group have, at the entry side of the stack, cross sections which are larger than cross sections of substantially all of the exhaust gas flow channels of The second group at the exit side of the stack.

16. The exhaust gas cleaning apparatus according to claim 14, wherein the exhaust gas flow channels of at least one of the first group and the second group have substantially constant cross sections along substantially an entire length thereof.

17. The exhaust gas cleaning apparatus according to claim 1,
wherein at least one of the exhaust gas flow channels of the first group has a cross section which continuously increases from the entry side to the exit side of the stack, and wherein at least one of the exhaust gas flow channels of the second group has a cross section which continuously decreases from the entry side to the exit side of the stack.

18. The exhaust gas cleaning apparatus according to claim 17, wherein substantially all of the exhaust gas flow channels of the first group have a cross section which continuously increases from the entry side to the exit side of the stack, and wherein at least one of the exhaust gas flow channels of the second group has a cross section which continuously decreases from the entry side to the exit side of the stack.

19. The exhaust gas cleaning apparatus according to claim 1,
wherein a mat made of the material which is permeable to the exhaust gas is disposed between a wall of the housing and the stack, and wherein at least one of the exhaust gas flow channels is defined by the mat in a direction transverse to the stacking direction.

20. An exhaust gas cleaning apparatus for cleaning an exhaust gas emitted from a combustion engine, the apparatus comprising:
a stack of plural material layers successively arranged on each other in a stacking direction,
wherein the material layers are made of a porous material being permeable to the exhaust gas,
wherein the stack has an entry side and an exit side;
wherein plural exhaust gas flow channels are defined in the stacking direction between two adjacent material layers in the stack;
wherein the exhaust gas flow channels are defined by surfaces of the material layers which have, when viewed in a flow direction of the exhaust gas from the entry side to the exit side, a plurality of concave and convex areas;
wherein a first group of exhaust gas flow channels is formed to be open at the entry side of the stack and closed at the exit side thereof;
wherein a second group of exhaust gas flow channels is formed to be closed at the entry side of the stack and open at the exit side thereof; and
wherein exhaust gas flow channels of the first and second groups are alternately arranged in the stacking direction;
further comprising at least one web extending transversely to the flow direction and joining two material layers defining the exhaust gas flow channels of the first group at the exit side of the stack.

21. An exhaust gas cleaning apparatus for cleaning an exhaust gas emitted from a combustion engine, the apparatus comprising:
a stack of plural material layers successively arranged on each other in a stacking direction,
wherein the material layers are made of a porous material being permeable to the exhaust gas,
wherein the stack has an entry side and an exit side;
wherein plural exhaust gas flow channels are defined in the stacking direction between two adjacent material layers in the stack;
wherein the exhaust gas flow channels are defined by surfaces of the material layers which have, when viewed in a flow direction of the exhaust gas from the entry side to the exit side, a plurality of concave and convex areas;
wherein a first group of exhaust gas flow channels is formed to be open at the entry side of the stack and closed at the exit side thereof;
wherein a second group of exhaust gas flow channels is formed to be closed at the entry side of the stack and open at the exit side thereof; and
wherein exhaust gas flow channels of the first and second groups are alternately arranged in the stacking direction;
further comprising at least one web extending transversely to the flow direction and joining two material layers defining one of the exhaust gas flow channels of the second group at the entry side of the stack.

22. The exhaust gas cleaning apparatus according to claim 20, wherein the web is formed of the material and integral with the two material layers.

23. The exhaust gas cleaning apparatus according to claim 21, wherein the web is formed of the material and integral with the two material layers.

24. An exhaust gas cleaning apparatus for cleaning an exhaust gas emitted from a combustion engine, the apparatus comprising:
- a stack of plural material layers successively arranged on each other in a stacking direction,
- wherein the material layers are made of a porous material being permeable to the exhaust gas,
- wherein the stack has an entry side and an exit side;
- wherein plural exhaust gas flow channels are defined in the stacking direction between two adjacent material layers in the stack;
- wherein the exhaust gas flow channels are defined by surfaces of the material layers which have, when viewed in a flow direction of the exhaust gas from the entry side to the exit side, a plurality of concave and convex areas;
- wherein a first group of exhaust gas flow channels is formed to be open at the entry side of the stack and closed at the exit side thereof;
- wherein a second group of exhaust gas flow channels is formed to be closed at the entry side of the stack and open at the exit side thereof; and
- wherein exhaust gas flow channels of the first and second groups are alternately arranged in the stacking direction;
- further comprising at least one spacer disposed between two adjacent material layers in the stack.

25. The exhaust gas cleaning apparatus according to claim 24, wherein the spacer is made of a corrugated flat material.

26. An exhaust gas cleaning apparatus for cleaning an exhaust gas emitted from a combustion engine, the apparatus comprising:
- a stack of plural material layers successively arranged on each other in a stacking direction,
- wherein the material layers are made of a porous material being permeable to the exhaust gas,
- wherein the stack has an entry side and an exit side;
- wherein plural exhaust gas flow channels are defined in the stacking direction between two adjacent material layers in the stack;
- wherein the exhaust gas flow channels are defined by surfaces of the material layers which have, when viewed in a flow direction of the exhaust gas from the entry side to the exit side, a plurality of concave and convex areas;
- wherein a first group of exhaust gas flow channels is formed to be open at the entry side of the stack and closed at the exit side thereof;
- wherein a second group of exhaust gas flow channels is formed to be closed at the entry side of the stack and open at the exit side thereof;
- wherein exhaust gas flow channels of the first and second groups are alternately arranged in the stacking direction; and
- wherein an average distance between two adjacent material layers in the stack is in a range from about 0.5 mm to about 8.0 mm.

27. An exhaust gas cleaning apparatus for cleaning an exhaust gas emitted from a combustion engine, the apparatus comprising:
- a stack of plural material layers successively arranged on each other in a stacking direction,
- wherein the material layers are made of a porous material being permeable to the exhaust gas,
- wherein the stack has an entry side and an exit side;
- wherein plural exhaust gas flow channels are defined in the stacking direction between two adjacent material layers in the stack;
- wherein the exhaust gas flow channels are defined by surfaces of the material layers which have, when viewed in a flow direction of the exhaust gas from the entry side to the exit side, a plurality of concave and convex areas;
- wherein a first group of exhaust gas flow channels is formed to be open at the entry side of the stack and closed at the exit side thereof;
- wherein a second group of exhaust gas flow channels is formed to be closed at the entry side of the stack and open at the exit side thereof; and
- wherein exhaust gas flow channels of the first and second groups are alternately arranged in the stacking direction;
- wherein an average distance between two adjacent material layers in the stack is in a range from about 1.5 mm to about 3.0 mm.

28. An exhaust gas cleaning apparatus for cleaning an exhaust gas emitted from a combustion engine, the apparatus comprising:
- a stack of plural material layers successively arranged on each other in a stacking direction,
- wherein the material layers are made of a porous material being permeable to the exhaust gas,
- wherein the stack has an entry side and an exit side;
- wherein plural exhaust gas flow channels are defined in the stacking direction between two adjacent material layers in the stack;
- wherein the exhaust gas flow channels are defined by surfaces of the material layers which have, when viewed in a flow direction of the exhaust gas from the entry side to the exit side, a plurality of concave and convex areas;
- wherein a first group of exhaust gas flow channels is formed to be open at the entry side of the stack and closed at the exit side thereof;
- wherein a second group of exhaust gas flow channels is formed to be closed at the entry side of the stack and open at the exit side thereof;
- wherein exhaust gas flow channels of the first and second groups are alternately arranged in the stacking direction; and
- wherein an amplitude of deviations of the concave and convex surface areas of at least one of the material layers from an average plane of the at least one material layer is more than about 1 mm.

29. An exhaust gas cleaning apparatus for cleaning an exhaust gas emitted from a combustion engine, the apparatus comprising:
- a stack of plural material layers successively arranged on each other in a stacking direction,
- wherein the material layers are made of a porous material being permeable to the exhaust gas,
- wherein the stack has an entry side and an exit side;
- wherein plural exhaust gas flow channels are defined in the stacking direction between two adjacent material layers in the stack;
- wherein the exhaust gas flow channels are defined by surfaces of the material layers which have, when viewed in a flow direction of the exhaust gas from the entry side to the exit side, a plurality of concave and convex areas;
- wherein a first group of exhaust gas flow channels is formed to be open at the entry side of the stack and closed at the exit side thereof;
- wherein a second group of exhaust gas flow channels is formed to be closed at the entry side of the stack and open at the exit side thereof;

wherein exhaust gas flow channels of the first and second groups are alternately arranged in the stacking direction; and wherein an amplitude of deviations of the concave and convex surface areas of at least one of the material layers from an average plane of the at least one material layer is less than about 7 mm.

30. An exhaust gas cleaning apparatus for cleaning an exhaust gas emitted from a combustion engine, the apparatus comprising:

a stack of plural material layers successively arranged on each other in a stacking direction, wherein the material layers are made of a porous material being permeable to the exhaust gas, wherein the stack has an entry side and an exit side;

wherein plural exhaust gas flow channels are defined in the stacking direction between two adjacent material layers in the stack;

wherein the exhaust gas flow channels are defined by surfaces of the material layers which have, when viewed in a flow direction of the exhaust gas from the entry side to the exit side, a plurality of concave and convex areas;

wherein a first group of exhaust gas flow channels is formed to be open at the entry side of the stack and closed at the exit side thereof;

wherein a second group of exhaust gas flow channels is formed to be closed at the entry side of the stack and open at the exit side thereof;

wherein exhaust gas flow channels of the first and second groups are alternately arranged in the stacking direction; and wherein an amplitude of deviations of the concave and convex surface areas of at least one of the material layers from an average plane of the at least one material layer is less than about 3 mm.

31. An exhaust gas cleaning apparatus for cleaning an exhaust gas emitted from a combustion engine, the apparatus comprising:

a stack of plural material layers successively arranged on each other in a stacking direction, wherein the material layers are made of a porous material being permeable to the exhaust gas, wherein the stack has an entry side and an exit side;

wherein plural exhaust gas flow channels are defined in the stacking direction between two adjacent material layers in the stack;

wherein the exhaust gas flow channels are defined by surfaces of the material layers which have, when viewed in a flow direction of the exhaust gas from the entry side to the exit side, a plurality of concave and convex areas;

wherein a first group of exhaust gas flow channels is formed to be open at the entry side of the stack and closed at the exit side thereof;

wherein a second group of exhaust gas flow channels is formed to be closed at the entry side of the stack and open at the exit side thereof;

wherein exhaust gas flow channels of the first and second groups are alternately arranged in the stacking direction; and wherein a lateral distance between the convex areas of at least one material layer is more than about 2 mm.

32. An exhaust gas cleaning apparatus for cleaning an exhaust gas emitted from a combustion engine, the apparatus comprising:

a stack of plural material layers successively arranged on each other in a stacking direction, wherein the material layers are made of a porous material being permeable to the exhaust gas, wherein the stack has an entry side and an exit side;

wherein plural exhaust gas flow channels are defined in the stacking direction between two adjacent material layers in the stack;

wherein the exhaust gas flow channels are defined by surfaces of the material layers which have, when viewed in a flow direction of the exhaust gas from the entry side to the exit side, a plurality of concave and convex areas;

wherein a first group of exhaust gas flow channels is formed to be open at the entry side of the stack and closed at the exit side thereof;

wherein a second group of exhaust gas flow channels is formed to be closed at the entry side of the stack and open at the exit side thereof;

wherein exhaust gas flow channels of the first and second groups are alternately arranged in the stacking direction; and wherein a lateral distance between the convex areas of at least one material layer is less than about 7 mm.

33. An exhaust gas cleaning apparatus for cleaning an exhaust gas emitted from a combustion engine, the apparatus comprising:

a stack of plural material layers successively arranged on each other in a stacking direction, wherein the material layers are made of a porous material being permeable to the exhaust gas.

wherein the stack has an entry side and an exit side;

wherein plural exhaust gas flow channels are defined in the stacking direction between two adjacent material layers in the stack;

wherein the exhaust gas flow channels are defined by surfaces of the material layers which have, when viewed in a flow direction of the exhaust gas from the entry side to the exit side, a plurality of concave and convex areas;

wherein a first group of exhaust gas flow channels is formed to be open at the entry side of the stack and closed at the exit side thereof;

wherein a second group of exhaust gas flow channels is formed to be closed at the entry side of the stack and open at the exit side thereof;

wherein exhaust gas flow channels of the first and second groups are alternately arranged in the stacking direction; and wherein a thickness of the material layers is more than about 0.1 mm.

34. An exhaust gas cleaning apparatus for cleaning an exhaust gas emitted from a combustion engine, the apparatus comprising:

a stack of plural material layers successively arranged on each other in a stacking direction, wherein the material layers are made of a porous material being permeable to the exhaust gas, wherein the stack has an entry side and an exit side;

wherein plural exhaust gas flow channels are defined in the stacking direction between two adjacent material layers in the stack;

wherein the exhaust gas flow channels are defined by surfaces of the material layers which have, when viewed in a flow direction of the exhaust gas from the entry side to the exit side, a plurality of concave and convex areas;

wherein a first group of exhaust gas flow channels is formed to be open at the entry side of the stack and closed at the exit side thereof;

wherein a second group of exhaust gas flow channels is formed to be closed at the entry side of the stack and open at the exit side thereof;

wherein exhaust gas flow channels of the first and second groups are alternately arranged in the stacking direction; and wherein a thickness of the material layers is less than about 1.2 mm.

35. An exhaust gas cleaning apparatus for cleaning an exhaust gas emitted from a combustion engine, the apparatus comprising:

a stack of plural material layers successively arranged on each other in a stacking direction, wherein the material layers are made of a porous material being permeable to the exhaust gas, wherein the stack has an entry side and an exit side;

wherein plural exhaust gas flow channels are defined in the stacking direction between two adjacent material layers in the stack;

wherein the exhaust gas flow channels are defined by surfaces of the material layers which have, when viewed in a flow direction of the exhaust gas from the entry side to the exit side, a plurality of concave and convex areas;

wherein a first group of exhaust gas flow channels is formed to be open at the entry side of the stack and closed at the exit side thereof;

wherein a second group of exhaust gas flow channels is formed to be closed at the entry side of the stack and open at the exit side thereof; and wherein exhaust gas flow channels of the first and second groups are alternately arranged in the stacking direction;

further comprising at least one fibre material layer defining the stack at a side surface thereof extending between the entry side and the exit side of the stack.

36. The exhaust gas cleaning apparatus according to claim 35, wherein the at least one fibre material layer surrounds the stack at all side surfaces thereof extending between the entry side and the exit side of the stack.

* * * * *